J. A. HEANY.
MEANS FOR SUPPLYING LIGHTING AND IGNITION CURRENT FOR AUTOMOBILE VEHICLES.
APPLICATION FILED JULY 27, 1910.
1,347,460.
Patented July 20, 1920.
4 SHEETS—SHEET 3.
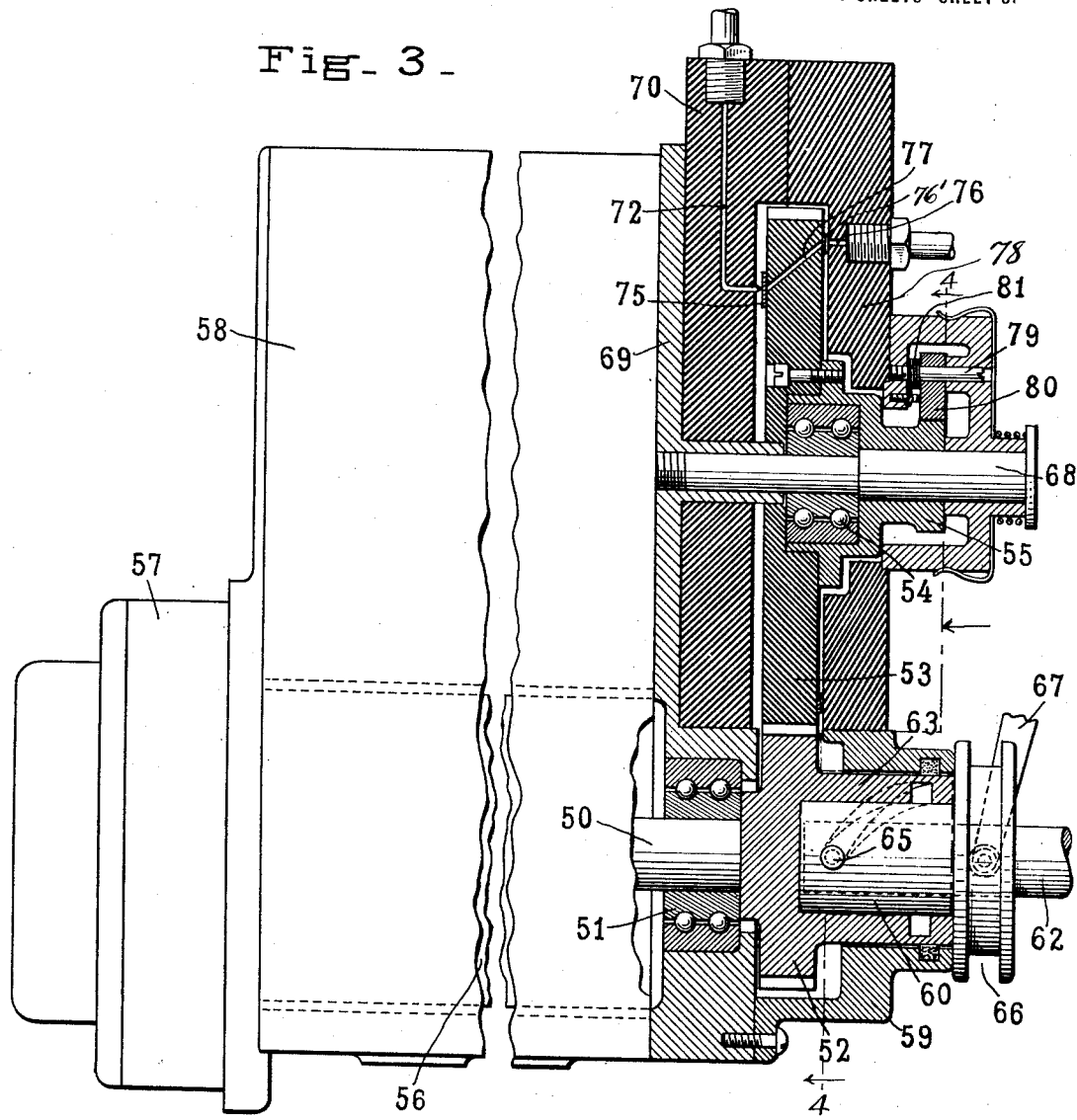
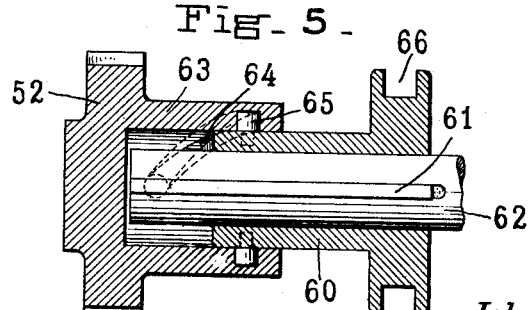
WITNESSES:
INVENTOR
John Allen Heany.
BY
ATTORNEY

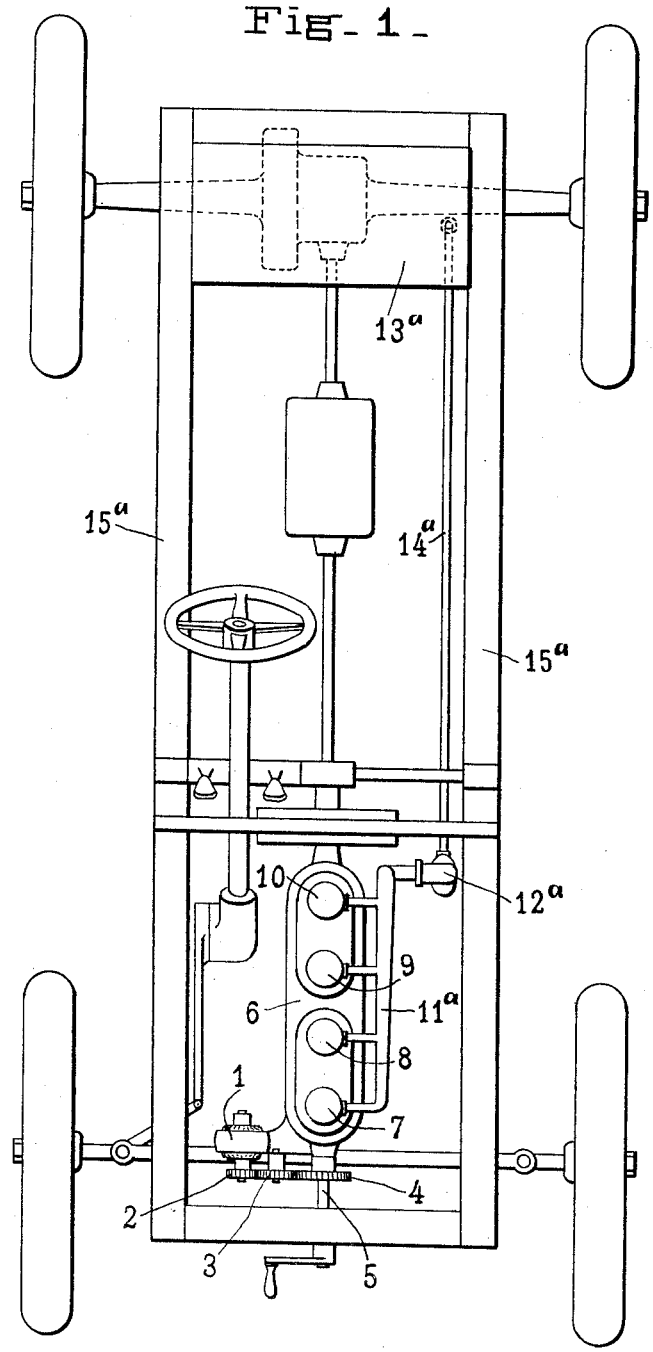

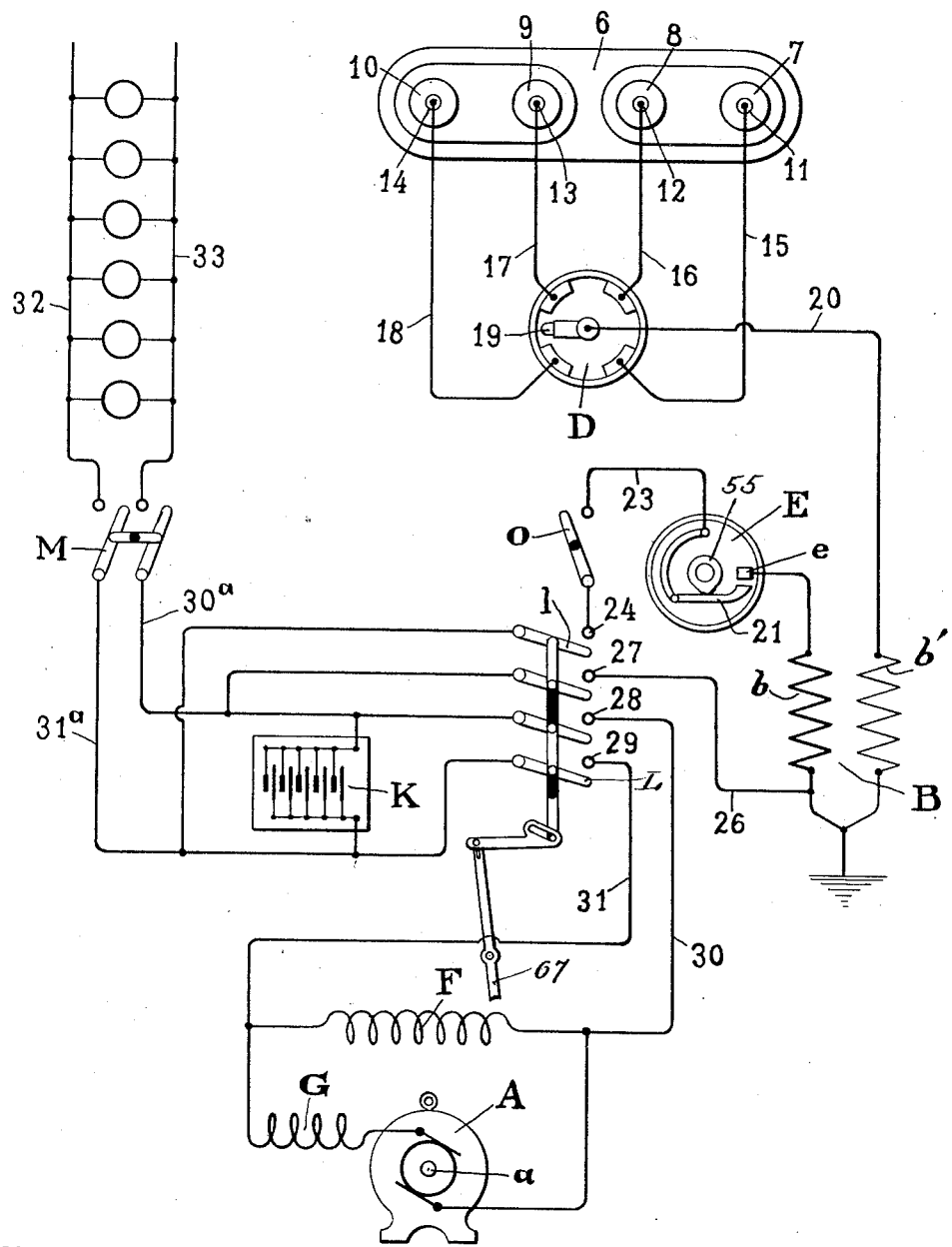

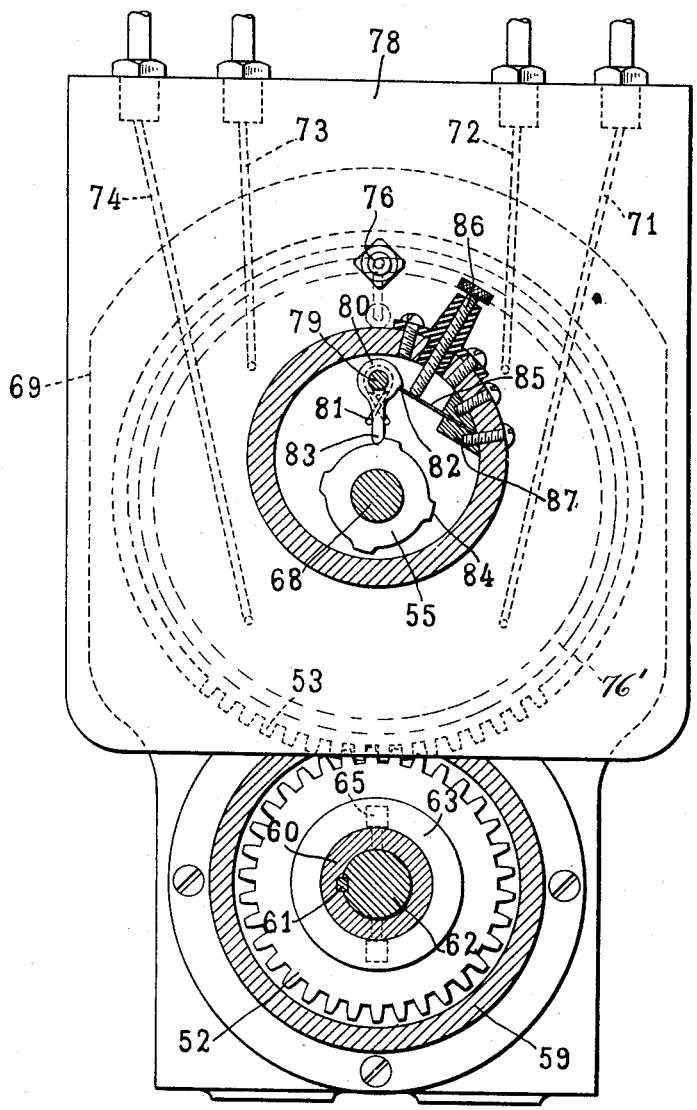

UNITED STATES PATENT OFFICE.

JOHN ALLEN HEANY, OF FLINT, MICHIGAN, ASSIGNOR, BY MESNE ASSIGNMENTS, TO INDUSTRIAL RESEARCH CORPORATION, A CORPORATION OF DELAWARE.

MEANS FOR SUPPLYING LIGHTING AND IGNITION CURRENT FOR AUTOMOTIVE VEHICLES.

1,347,460.  Specification of Letters Patent.  Patented July 20, 1920.

Application filed July 27, 1910. Serial No. 574,030.

*To all whom it may concern:*

Be it known that I, JOHN ALLEN HEANY, a citizen of the United States, and a resident of Flint, in the county of Genesee and State of Michigan, have invented certain new and useful Improvements in Means for Supplying Lighting and Ignition Current for Automotive Vehicles, of which the following is a full, clear, and exact description, whereby anyone skilled in the art may make and use the same.

The invention, as indicated by its name, relates to a mechanism for application to an automobile in connection with its prime mover for supplying lighting and ignition currents of electricity. It relates more particularly to a device which in application may take the place of the ordinary magneto and which will deliver current of a substantially constant character for charging a source of supply and providing the necessary current for ignition purposes and for lighting or other purposes.

The object of the invention is to provide in conjunction with a prime mover of the automobile, a dynamo electric machine differentially wound to produce a substantially constant current pressure under varying speed conditions combined with a storage battery in conjunction with a load circuit and controlling devices and an automatic means for disconnecting the dynamo electric machine from the storage battery when the latter discharges into said dynamo electric machine and the same tends to operate as a motor.

A further object of my invention is to provide an electrical system for automotive vehicles in which ignition is supplied by an inherently regulated dynamo-electric machine in combination with an ignition system of the closed circuit type so as to maintain the current in the electrical system at approximately constant potential regardless of speed changes in the prime mover and the dynamo-electric machine.

In ordinary generating elements, the voltage increases in nearly direct proportion to the speed of the armature. It follows that at low speeds the electro-motive force is quite insufficient for the purposes desired and being less than that of the battery which may be used in conjunction therewith, the latter discharges through the armature. It also follows that at high speeds the electro-motive force of the generator rises to an undue extent, thus causing a heavy flow of current through the various circuits and storage supply or battery tending to injure and disrupt said apparatus.

To eliminate these disadvantages, various forms of friction clutches, mechanical and electrical cut-outs have been suggested in connection with a dynamo electric machine whereby it might maintain a current condition of proper tension.

These various devices have not only been complicated but unsatisfactory, inasmuch as they do not control quickly enough to maintain a constant electro-motive force.

It is the main object of the present invention to provide a mechanism which, so far as possible, will over-come these objections and it is proposed to utilize a dynamo electric machine geared or otherwise connected with the prime mover or engine which will generate a current of substantially constant electro-motive force through the various speed ranges to which the generator is subjected.

Referring to the drawings:

Figure 1 is a somewhat diagrammatic plan view of the chassis of an automobile with the apparatus in place.

Fig. 2 is a diagrammatic view illustrating the various elements and devices employed in conjunction with the system.

Fig. 3 is a partial vertical sectional view through the dynamo electric machine.

Fig. 4 is an end view of the same with parts broken away to better illustrate the construction.

Fig. 5 is a detail sectional view of the automatic switch controlling devices.

As indicated by the objects set forth, it is proposed to provide a substantially constant electro-motive force throughout the speed range to which the dynamo electric machine is subjected. In the application of the invention to an automobile, the greatest possible range of speed change is encountered inasmuch as the load is constantly varying and the speed of the engine varies from zero to a maximum. It is necessary to secure a substantially constant electro-motive force during the greater part of this speed range.

In the form of the invention specifically described, it is proposed to utilize a shunt field winding in conjunction with a series field winding, thus providing a field excitation of opposed character to that of the shunt winding and one which is always less than the latter. With this arrangement, as the armature speed increases and the electromotive force increases there will be a direct increase through the armature and series winding, thus increasing the field excitation through the series coils, which are opposed to the shunt field windings and consequent excitation. Thus, the resultant field flux density will be reduced, since the electro-motive force of the generator is substantially proportional to the product of the armature speed and field strength and any increase in speed, which tends to increase the electro-motive force, produces a decreased field strength and thus maintains such a substantially constant electro-motive force, that the battery, ignition apparatus, lamps or any other current translating devices included in the system will not be subjected to any injurious effects.

The ideal conditions of such an internal automatic control are secured by making the shunt excitation equal to or less than the value corresponding to the break in the magnetization curve of the material of the field core, so that the resultant excitation ranging from low value to this point as a maximum will produce a field strength directly proportional to it, inasmuch as between these values, the magnetization curve is nearly a straight line.

In the accompanying drawings the dynamo electric machine 1, is illustrated as connected by gears 2, 3, 4, to the shaft 5, of the engine 6. This engine is for convenience illustrated as of the four-cylinder type having its cylinders 7, 8, 9, 10, arranged to receive a supply of explosive mixture through the manifold 11$^a$, and carbureter 12$^a$, from a main supply tank 13$^a$, with intermediate connection 14$^a$.

The chassis frame is indicated at 15$^a$, and bears the various parts of the mechanism making up an ordinary chassis frame, the several parts of which need no detail description.

In the diagrammatic view illustrated in Fig. 2, the engine cylinders 7, 8, 9, 10, are illustrated as provided with spark plugs 11 to 14, inclusive, which plugs, of course, have one of their terminals grounded in the engine and frame while the other is connected with the respective circuit wires 15 to 18, inclusive. These line-wires terminate in the relatively stationary contacts of the distributer, D, the movable contact 19, thereof being connected with a circuit wire 20, which, through the secondary coil $b'$, and primary coil $b$, of the spark coil B, is connected with the make and break device E, through its stationary contact $e$. The movable contact 21, actuated by a cam or suitable device 55, is connected through a line wire 23, with the switch contact 24. The opposite side of the circuit 26, which runs from the primary coil $b$, is connected with a switch contact 27.

There are also two switch contacts 28, 29, which respectively connect with the circuit line wires 30, 31, that connect with the dynamo electric machine A, whereby the entire battery is connected in parallel with the generator and ignition system.

This dynamo electric machine A, is, of course, provided with an armature $a$, and with a series field winding G, and a shunt field winding F, which, through the circuit 30, 31, connect the dynamo electric machine with a storage battery K, through the switch L, which, as indicated herein, is formed as a unit with the switch member $l$, that controls the lines 23, 26, of the ignition circuit that is also connected with the storage battery K, and the main line wires of the dynamo electric machine when the switch L, $l$, is closed. This automatic control of the ignition system forms the basis for my Patent No. 1,301,053, April 15, 1919, which is a division of this application.

A lamp circuit 32, 33, is indicated as controlled by a switch M, which switch is connected with the line circuit 30$^a$, 31$^a$.

Of course, it is understood that the form of ignition apparatus is entirely immaterial, but the type of system preferably employed and the one disclosed is that of the normally closed circuit type, this type of ignition system with its relatively high inductance and time constant as compared to the ignition systems of the normally open circuit type appearing to be peculiarly adapted for use in combination with an inherently regulated variable speed generator. The various controlling switches of the main line circuit may be varied to suit any particular condition. It is preferred, however, that the switches L, $l$, are so arranged and interlocked that the main line circuit 30, 31, of the generator will be closed in relation to the storage battery K, and main line 30$^a$, 31$^a$, only when the ignition circuit 23, 26, is closed. Otherwise, it is apparent that with the engine at rest, the storage battery K, might discharge through the dynamo electric machine.

As illustrating the dynamo electric machine more in detail, reference is made to Figs. 3, 4 and 5, wherein the armature shaft 50, is illustrated as suitably mounted upon anti-friction bearings 51, and attached to a gear 52, which gear is in mesh with a gear 53, mounted upon anti-friction bearings 54, and providing a means for rotating a make and break cam 55.

The armature 56, is provided with suitable commutator and brush connections arranged in the head-piece 57. These parts are not shown in detail nor are the fields arranged within the casing 58, specifically shown in detail.

To the front of the main casing of the dynamo electric machine is secured a casing 59, which provides a suitable bearing for the support of the gear 52, and an axially movable sleeve 60. This sleeve, as illustrated herein, is, through a spline 61, connected with a sectional shaft 62, which, in turn, is connected through the gears 2, 3, 4, with the main shaft of the engine.

The gear 52, has an extended sleeve 63, provided with helical slots or cam grooves 64, within which are arranged pins 65, that are secured to the axially movable sleeve 60. The sleeve 60, is also provided with a grooved actuator 66, which, through any suitable lever 67, may be utilized to actuate a switch device such as illustrated in diagram at L, l, or for any purpose for controlling the various circuits.

The engine may be started by a crank or any other suitable form of starting mechanism. In Fig. 1 a starting crank is mounted on the forward end of the engine shaft 5 as is usual in the art. It can be seen that when the crank is operated to start the engine the sleeve 60 on the shaft 62, rotated by the crank at such time, is shifted through the groove and pin connection 64 and 65 to close the switch. In the event of the engine shaft stopping or running at an abnormally low speed, the armature shaft 50, will be driven through the action of the storage battery (driving the dynamo electric machine as a motor) at a sufficient speed to cause the sleeve 60, to move to the right as indicated in Figs. 3 and 5. Thereupon, the lever 67, will be moved to open the switch or switches illustrated at L, l, in the diagram. Obviously, with this arrangement, there is an automatic change of connections which will preclude the possibility of the battery discharging through the dynamo electric machine when the engine is at rest. When the engine is started by the crank the shaft 62 is rotated faster than the armature shaft 50 is rotated when the electric machine is operated as a motor to open the switch so that the switch is held closed while the engine is being started.

Obviously, any form of timing device may be employed with the dynamo electric machine indicated.

In Figs. 3 and 4, however, there is illustrated a form of timing device which is built into and forms a substantial part of the dynamo electric machine, such construction forming the subject-matter of Patent No. 1,305,601, June 3, 1919, which is a division of application 203,171, filed Nov. 21, 1912, now Patent No. 1,301,053, Apr. 15, 1919, which in turn is a division of this application.

The gear 53, heretofore referred to and the timing cam 55, are mounted to rotate upon the anti-friction bearings 54, which are supported upon a spindle 68, which spindle is secured in the face plate 69, of the machine in any desired manner.

An insulating plate 70, provided with suitable conductors 71, to 74, inclusive, provides a means for bringing the inner terminals of said conductors successively into position to take current from the plate 75, on the rotating member 53. The opposite side of the circuit is connected through a conductor 76, to a ring plate 76' and thence through the conductor 77, to the plate 75. Because of the high tension current developed in the ignition circuit, it is not necessary that actual contact be established between the inner ends of conductor 76 and plate 76' or between plate 75 and the ends of conductors 71—74 for the reason that the high tension current will jump the small gaps between the conductors and the adjacent plates.

Secured to an insulating plate 78, is a stud 79, upon which is mounted a trip finger 80, held in normal position by a spring 81, and having a lip 82, and a lever arm 83. The latter comes in contact and is moved by the bosses 84, of the timing cam 55, so that the vibrator spring 85, will be drawn away from the contact post 86, at given periods to break the circuit. The vibrator spring 85, is mounted in a block 87, in any suitable manner.

With this arrangement of parts, it is apparent that the timing device will always operate synchronously with the generating apparatus and both devices are conveniently coalesced to form a unit which, with the ordinary controlling devices, may be mounted upon the engine in lieu of an ordinary magneto. At the same time, this device will provide current of a substantially uniform character for the ignition circuit, for the lighting circuit and for charging the storage supply.

In diagram in Fig. 2, there is illustrated a switch O, which may be utilized for making and breaking the ignition circuit. This, of course, is such a switch as is ordinarily employed on automobiles and must be closed in order to effectively operate the other elements. On the other hand, to stop the engine, this ignition switch may be opened and thereupon the engine, through its reduced speed, will permit battery K to drive the dynamo electric machine A as a motor and cause the automatic switch lever 67, to be moved through the sleeve 60, to properly cut out the ignition and generator circuits at switches L, l, as hereinbefore described.

Obviously, the elements might be arranged in various forms of juxta-position or the details of the mechanism might be varied without departing from the spirit or intent of the invention, which, in the main, contemplates a generating apparatus combined with timing, ignition, lighting and storage devices and which will deliver thereto a current of substantially constant value under varying speed conditions.

The particular embodiment of my invention herein disclosed is, of course, susceptible of considerable variation without departing from the spirit thereof, and it is to be understood that many changes might be made by those skilled in the art within the scope of the invention as defined in the appended claims.

What I claim as my invention and desire to secure by Letters Patent is:

1. In an apparatus for generating and supplying lighting and ignition current for automobile vehicles, the combination of a convertible electric generator and motor, a storage battery connected thereto, an engine for driving the vehicle and the electric machine, a switch for cutting the generator off from the battery and the load circuit, and an automatic device for opening said switch when the electromotive force of the battery overcomes that of the generator and thus converts the generator temporarily into a motor.

2. In an apparatus for generating and supplying lighting and ignition current for automobile vehicles, the combination of a prime mover for said vehicle, a convertible generator and motor driven thereby to generate current, a storage battery in circuit with the generator, so as to be capable of converting the generator into a motor when the generation of current is reduced to an electromotive force below that of the battery, a switch in the circuit between the battery and the generator, and an automatic device operated when the generator is converted into a motor as above set forth to open said switch and thus cut the battery off from the generator.

3. In an apparatus for generating and supplying lighting and ignition current for automobile vehicles, the combination of a prime mover for said vehicle, a convertible generator and motor driven thereby to generate current, a storage battery in circuit with the generator, so as to be capable of converting the generator into a motor when the generation of current is reduced to an electromotive force below that of the battery, a switch in the circuit between the battery and the generator, and an automatic device interposed in the connections between the prime mover and the motor generator operating when the generator is converted into a motor to open said switch.

4. In an apparatus for generating and supplying lighting and ignition current for automobile vehicles, the combination of a prime mover for said vehicle, a convertible generator and motor driven thereby to generate current, a storage battery in circuit with the generator, so as to be capable of converting the generator into a motor when the generation of current is reduced to an electromotive force below that of the battery, a switch in the circuit between the battery and the generator, and a sliding device interposed in the connections between the prime mover and the motor generator operating when the generator is converted into a motor to open said switch.

5. In an apparatus for generating and supplying lighting and ignition current for automobile vehicles, the combination with the prime mover for driving the vehicle, a convertible electric motor generator for supplying the current aforesaid, a storage battery in circuit with the generator adapted to drive the latter as a motor under certain conditions, a switch in the circuit between the battery and the generator, gearing connecting the prime mover and the generator, a sliding sleeve connected with said switch, and means interposed between said sleeve and said gearing for moving the sleeve to open the switch when the generator is driven as a motor.

6. In an apparatus for generating and supplying lighting and ignition current for automobile vehicles, the combination with the prime mover for driving the vehicle, a convertible electric motor generator for supplying the current aforesaid, a storage battery in circuit with the generator adapted to drive the latter as a motor under certain conditions, a switch in the circuit between the battery and the generator, driving connections between the prime mover and the motor generator, a driving shaft, a sliding sleeve on said shaft, a pin and slot connection between said sleeve and the generator shaft and connections between said sleeve and said shaft, whereby the latter is opened when the generator is driven as a motor.

7. The combination with a dynamo electric machine having an armature shaft, and a switch controlling the exterior circuit thereof, of a driving member associated with the armature shaft for driving the same capable of axial movement with respect thereto and coöperative with said switch to open or close the same by such axial movement.

8. In an apparatus for generating and supplying current, the combinatoin of a dynamo electric machine adapted to operate as a motor and as a generator to charge a storage battery, means for driving said dynamo electric machine, a switch for controlling the charging circuit, said means being operative to cause the opening of said switch when the electro-motive force of the battery overcomes that of the dynamo electric machine, thus converting the dynamo electric machine temporarily into a motor.

9. An electric system for automotive vehicles comprising a variable speed engine for driving the vehicle, means for starting said engine, a storage battery and translating devices, a dynamo-electric machine driven from the variable speed engine and comprising a rotor the rotative speed of which varies with the speed of the engine, and field exciting means connected to inherently control the excitation to maintain an approximately constant voltage in said system independent of speed changes of the dynamo-electric machine when the same is connected in the system, and automatic electrically operated means for breaking the circuit between said machine and storage battery when the voltage of the machine falls below that of the battery said automatic means being operated by said starting means to make the circuit.

10. An electric lighting and ignition system for automotive vehicles comprising a variable speed internal combustion engine for driving the vehicle and having ignition means, a storage battery and translating devices including said ignition means, a dynamo-electric machine driven from the variable speed engine and comprising a rotor the rotative speed of which varies with the speed of the engine, and field exciting means connected to inherently control the excitation to maintain an approximately constant voltage in said system independent of speed changes of the dynamo-electric machine when the same is connected in the system, and automatic means for breaking the circuit between said machine and the storage battery when the voltage of the machine falls below that of the battery, said automatic means being operated to make the circuit while the engine is being started.

11. In an automotive vehicle, the combination with a variable speed internal combustion engine, of an electrical system comprising a storage battery, translating devices, including an ignition system and a dynamo-electric machine including a rotor, adapted to be driven at varying speeds by the engine, said dynamo-electric machine having means associated and coöperating therewith whereby excessive current flow from the battery to the dynamo-electric machine is prevented by the motorizing of the dynamo-electric machine, when the voltage of the dynamo-electric machine falls below that of the battery.

12. In an electric system, the combination of a storage battery, a dynamo-electric machine adapted to charge said storage battery; a prime mover for actuating said dynamo-electric machine; starting means adapted to be operated for starting said prime mover, a circuit for connecting said dynamo-electric machine to said storage battery and switch means intercalated therein closed at the starting operation and means dependent upon the continued flow of current from the battery to the dynamo-electric machine for automatically opening said switch means upon failure of the prime mover to start upon cessation of the operation of said starting means.

13. In an automotive vehicle, the combination with a variable speed internal combustion engine, of an electrical system comprising a storage battery, translating devices including an ignition system for said engine, including a primary circuit, a secondary circuit, a make and break mechanism for the primary circuit including contacts adapted to be opened and closed, means for effecting an opening of said contacts, means for maintaining said contacts closed for a greater part of the period of the cycle of operation of the make and break mechanism, and a dynamo-electric machine comprising a rotor the rotative speed of which varies with the speed of the engine, and field exciting means connected to inherently control the excitation to maintain an approximately constant voltage in said system independent of speed changes of the dynamo-electric machine when the same is connected in the system.

14. In an automotive vehicle, the combination with a variable speed internal combustion engine, of an electrical system comprising a storage battery, translating devices including electric lamps and an ignition system for said engine, including a primary circuit, a secondary circuit, a make and break mechanism for the primary circuit including contacts adapted to be opened and closed, means for effecting an opening of said contacts, means for maintaining said contacts closed for a greater part of the period of the cycle of operation of the make and break mechanism, a dynamo-electric machine comprising a rotor the rotative speed of which varies with the speed of the engine, and field exciting means connected to inherently control the excitation to maintain an approximately constant voltage in said system independent of speed changes of the dynamo-electric machine when the same is connected in the system, and current-actuated means automatically disconnecting said dynamo-electric machine from said system.

15. In an automotive vehicle, the combination with a multiple cylinder variable speed internal combustion engine, of an electrical system including a storage battery, translating devices including an ignition system having an induction coil, a primary circuit, a secondary circuit, a make and break mechanism for the primary circuit including contacts adapted to be opened and closed, means for effecting an opening of said contacts, means for maintaining said contacts closed for a greater part of the period of the cycle of operation of the make and break mechanism, a distributer for the distribution of high tension current to each of said cylinders, a dynamo-electric machine having a rotor the rotative speed of which varies with the speed of the engine, and field exciting means arranged for unbroken current flow and connected to inherently control the excitation to maintain an opproximately constant voltage in said system independent of speed changes of said dynamo-electric machine, said dynamo-electric machine being connected to automatically supply current to the ignition circuit without flowing through said battery and to said entire battery in parallel with said ignition circuit.

16. In an automotive vehicle, the combination with a multiple cylinder variable speed internal combustion engine, of an electrical system including a storage battery, translating devices including a lighting circuit and an ignition system having a single induction coil, a primary circuit, a secondary circuit, a make and break mechanism for the primary circuit including contacts adapted to be opened and closed, means for effecting an opening of said contacts, means for maintaining said contacts closed for a greater part of the period of the cycle of operation of the make and break mechanism, a distributer for distributing high tension current to each of said cylinders, a dynamo-electric machine having a rotor the rotative speed of which varies with the speed of the engine, and field exciting means arranged for unbroken current flow and connected to inherently control the excitation to maintain an approximately constant voltage in said system independent of speed changes of said dynamo-electric machine, said dynamo-electric machine being connected to automatically supply current to said ignition circuit without flowing through said battery and to said entire battery and lighting circuit in parallel with said ignition circuit.

17. In an apparatus for generating and supplying lighting and ignition current for automobile vehicles, the combination of a prime mover for said vehicle, a dynamo-electric machine driven thereby having a rotor the rotative speed of which varies with the speed of the engine, and field exciting means arranged for unbroken current flow and adapted to inherently regulate the excitation to prevent a decrease in voltage as the rotor speed falls, a storage battery adapted to be connected to said dynamo-electric machine, an ignition system for said prime mover including a primary circuit, a secondary circuit, a make and break mechanism for the primary circuit including contacts adapted to be opened and closed, means for effecting an opening of said contacts, means for maintaining said contacts closed for a greater part of the period of the cycle of operation of the make and break mechanism, a switch in the circuit between the battery and dynamo-electric machine, and an automatic device operated by current flow from the battery to the dynamo-electric machine to open the switch and thus cut the battery off from the dynamo-electric machine.

JOHN ALLEN HEANY.

Witnesses:
EDWARD SIMON,
FRED. M. McLAREN.